United States Patent [19]

Cook

[11] Patent Number: 5,262,109
[45] Date of Patent: Nov. 16, 1993

[54] METHOD AND APPARATUS FOR FORMING MULTILAMINATE FILM

[75] Inventor: Stephen O. Cook, East Orleans, Mass.

[73] Assignee: James River II, Inc., Oakland, Calif.

[21] Appl. No.: 962,967

[22] Filed: Oct. 19, 1992

[51] Int. Cl.[5] .................................................. B25C 47/26
[52] U.S. Cl. ................................... 264/173; 264/514;
264/209.8; 425/133.1; 425/326.1; 425/462
[58] Field of Search ............ 264/173, 514, 515, 209.8;
425/326.1, 327, 380, 462, 133.1, 131.1

[56] References Cited

U.S. PATENT DOCUMENTS

| | | | |
|---|---|---|---|
| 3,966,377 | 6/1976 | Upmeier | 264/514 |
| 4,042,661 | 8/1977 | Cook . | |
| 4,182,603 | 1/1980 | Knittel | 425/462 |
| 4,224,272 | 9/1980 | Klein | 425/326.1 |
| 4,281,981 | 8/1981 | Feldman | 425/131.1 |
| 4,298,325 | 11/1981 | Cole . | |
| 4,395,221 | 7/1983 | Herrington | 264/173 |
| 4,687,430 | 8/1987 | Morris et al. | 425/462 |

FOREIGN PATENT DOCUMENTS 51-19466  6/1976  Japan ............................ 425/133.1

OTHER PUBLICATIONS

H. H. Winter and H. G. Fritz, Design of Dies for the Extrusion of Sheets and Annular Parisons: The Distribution Problem, published in ANTEC '84, pp. 49-51.

Primary Examiner—Jeffery Thurlow
Attorney, Agent, or Firm—Thomas R. Lampe

[57] ABSTRACT

A system and process for producing a tubular multilaminate film having a plurality of bonded resin sheets. At least one of the sheets is formed from an annular resin stream of spirally extruded resin and at least one of the sheets is formed from an annular resin stream of non-spirally extruded resin.

8 Claims, 3 Drawing Sheets

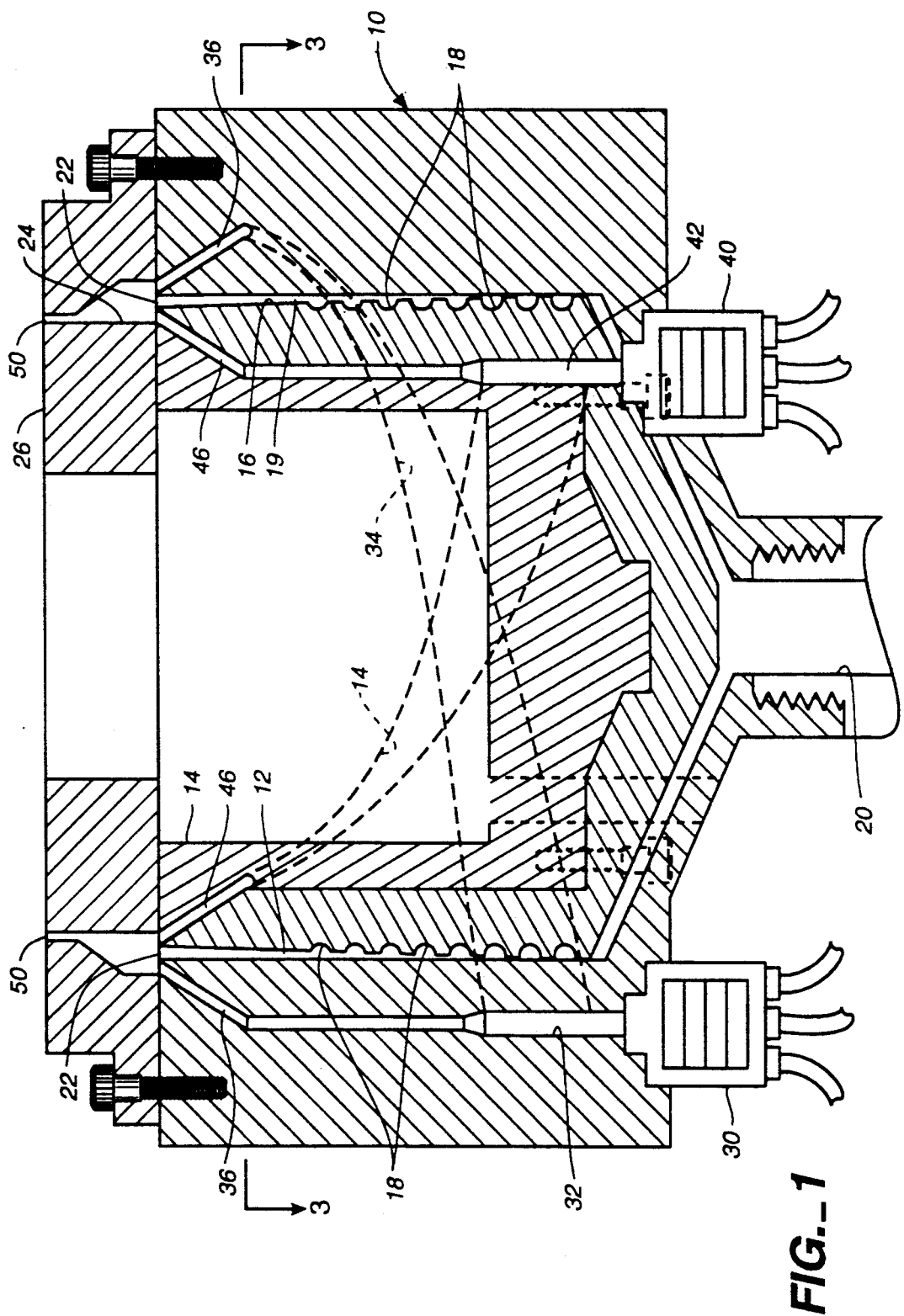

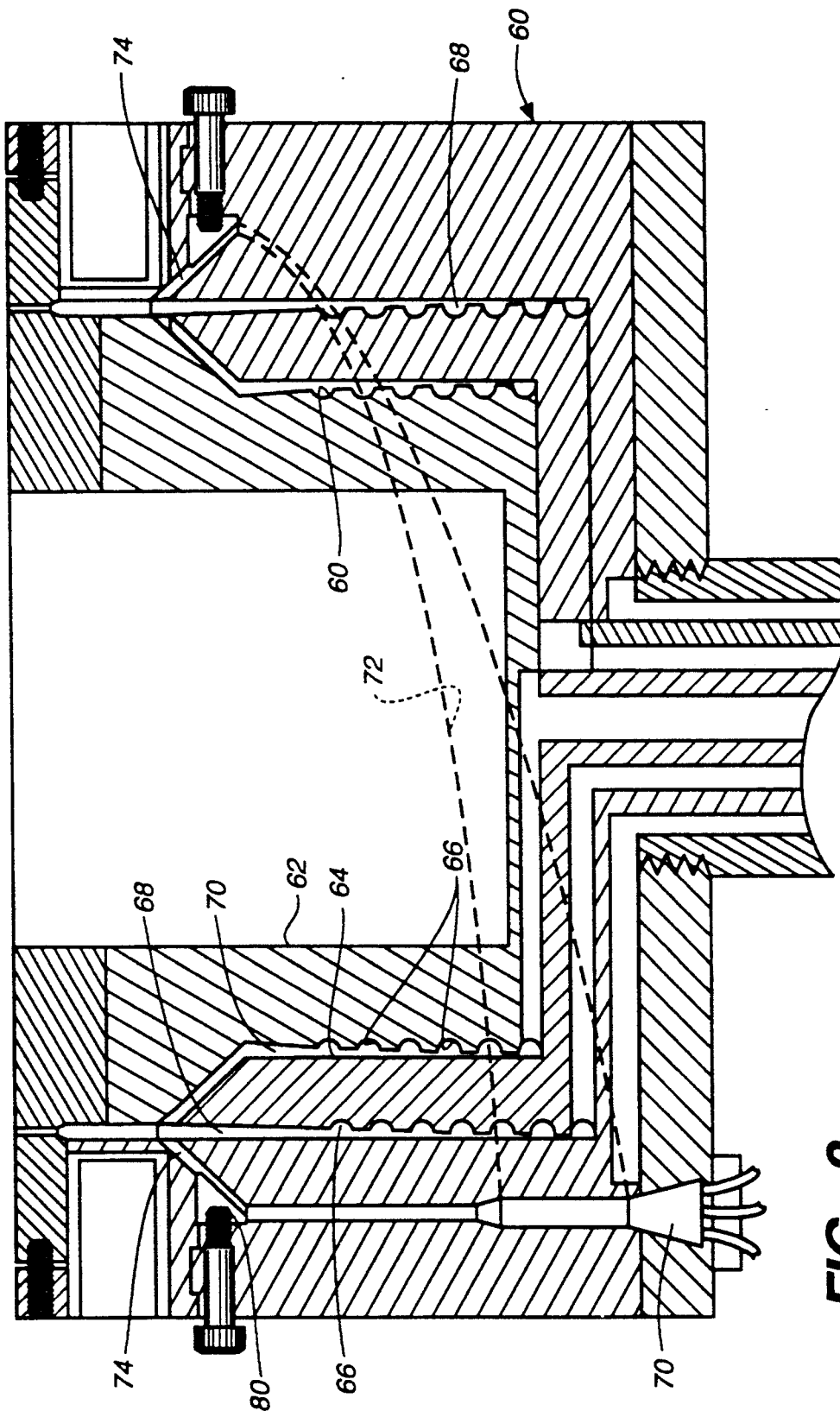
FIG._2

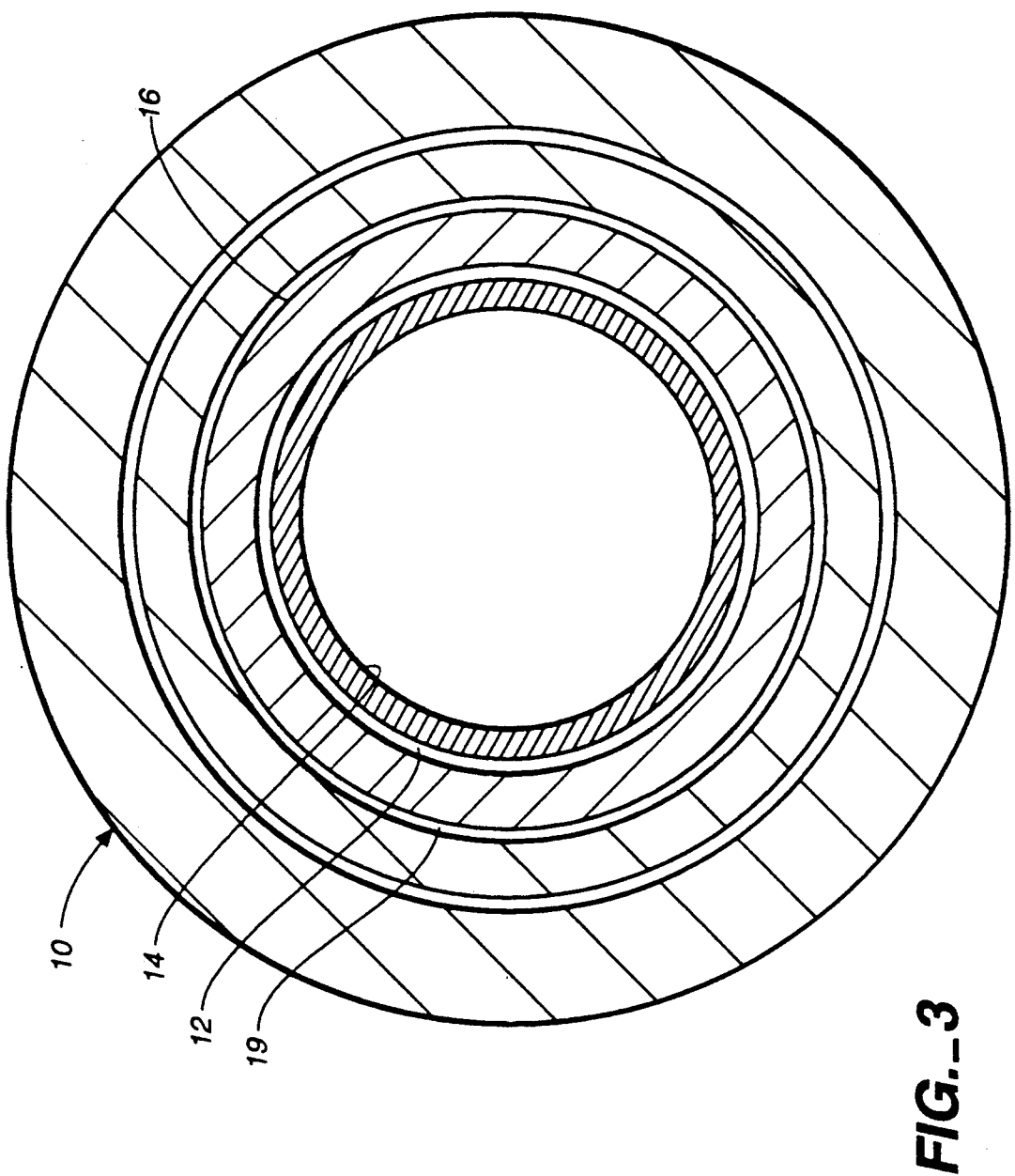
FIG._3

METHOD AND APPARATUS FOR FORMING MULTILAMINATE FILM

TECHNICAL FIELD

This invention relates to the formation of multilaminate plastic film. More particularly, the invention encompasses a method and apparatus wherein a tubular multilaminate film is extruded from a die during manufacture of blown multilaminate film.

BACKGROUND ART

U.S. Pat. No. 4,042,661, issued Aug. 16, 1977, discloses a method and apparatus for forming tubular multilaminate plastic film. The apparatus incorporates a die body having two inlet passageways, each of which is adapted to receive a stream of resin. Each inlet passageway is in communication with an annular chamber. The annular chambers are substantially concentric and each communicates with an annular outlet passageway. The outlet passageways converge to form a single common annular passageway.

As each resin stream of the arrangement disclosed in U.S. Pat. No. 4,042,661 enters the die body and flows through the inlet passageway, it has a generally rectangular cross section. When it enters the annular chamber, it divides into two substreams which flow laterally in opposite directions to form, when they are joined together, a stream having an annular cross section. The respective annular streams flow from the annular chambers through the outlet passageways and converge where the outlet passageways converge to form a composite stream which flows through the common outlet passageway into a conventional die head from which the composite stream is expressed to form a tubular multilaminate film, which may be inflated with air to form blown film.

While the arrangement disclosed in U.S. Pat. No. 4,042,661 is highly satisfactory in many respects, some difficulties are encountered when the operator attempts to regulate the flow of the annular stream from the inner annular chamber. Access to the adjustment mechanism of the inner choke ring commonly employed for such purpose is difficult and proper adjustment can be a time consuming chore.

The present invention overcomes the aforesaid difficulties by utilizing a die component of the spiral mandrel type to form at least one of the sheets or laminae of an extruded multilaminate tubular film. U.S. Pat. No. 4,298,325, issued Nov. 3, 1981, discloses another version of a die for the extrusion of plastic material in tube form. In that patent, a plastic tube having a highly uniform wall thickness is formed. Because spiral manifolds are center fed and symmetrical, they normally require no adjustments for different resins or conditions. However, such devices are very unwieldy and not totally applicable for the formation of thin film layers.

The system of the present invention has the positive attributes of the two tubular multilaminate film formation techniques just described, without their disadvantages. According to the invention, a film is produced which has a base lamina or sheet of highly uniform thickness formed from spirally extruded resin and a multi-layered sheet bonded to the base sheet formed of a plurality of thin layers formed from non-spirally extruded resin.

Another advantage of the present invention is its utilization of a manifold and slit employed in the formation of the multi-layered sheet having shear rates substantially equal and constant. Both layer and thickness uniformity of the non-spirally extruded sheet are a consequence. While the general concept of making manifold and slit shear rates substantially equal and constant has been recognized as applicable to small flat dies (see the paper entitled *Design of Dies for the Extrusion of Sheets and Annular Parisons: The Distribution Problem* by H. H. Winter and H. G. Fritz published in *ANTEC '84*, pages 49–51), the present invention is the first to apply such principle to large blown dies, thus eliminating the need for choker rings or other adjustment arrangements. Furthermore, the paper just noted is concerned with monolayer extrusions and does not at all concern itself with coextruded films.

DISCLOSURE OF INVENTION

The present invention is directed to apparatus for producing a tubular multilaminate film, said multilaminate film including a plurality of bonded resin sheets.

The apparatus includes a die body having an inner surface defining an interior. A die member is disposed within the interior. The die member has an outer surface positioned adjacent to the die body inner surface and defining helical channels in communication with the outer surface.

The die body inner surface, the die member outer surface, and the helical channels define a first flow path for a first annular resin stream of spirally extruded resin. The first flow path has an entry end and an exit end.

Means is provided for defining a second flow path spaced from the first flow path for a second annular resin stream of non-spirally extruded resin. The second flow path has an entry end and an exit end.

Means is provided for combining the annular streams of spirally extruded resin and non-spirally extruded resin, the combining means defining an annular discharge orifice in communication with the first and second flow paths through which the combined streams of spirally extruded resin and non-spirally extruded resin are expressed while in engagement to form the tubular multilaminate film.

According to an embodiment of the invention, the apparatus additionally includes means defining a third flow path spaced from the first and second flow paths for a third annular resin stream of non-spirally extruded resin. The third flow path has an entry end and an exit end and the third flow path is in communication with the combining means annular discharge orifice whereby the third annular resin stream is expressed through the annular discharge orifice along with the first and second annular resin streams. The second and third flow paths are disposed on opposite sides of the first flow path and spaced therefrom whereby the tubular multilaminate film comprises an inner base sheet formed from spirally extruded resin and two spaced outer sheets formed from non-spirally extruded resin.

The second flow path includes a manifold and an annular slit communicating with the manifold and the annular discharge orifice. The manifold and the annular slit have substantially constant and equal shear rates.

The present invention also encompasses a method of producing a tubular multilaminate film having a plurality of bonded resin sheets. The method includes the step of forming an annular stream of spirally extruded resin. The annular stream of spirally extruded resin is directed toward an annular discharge orifice.

Simultaneously with the step of forming an annular stream of spirally extruded resin, a first annular stream of non-spirally extruded resin is formed. The first annular stream of non-spirally extruded resin is also directed toward the annular discharge orifice.

The annular streams are maintained spaced and separated while the annular streams are directed toward the annular discharge orifice. The annular streams are combined at the annular discharge orifice and expressed through the annular discharge orifice while maintaining the combined annular streams in engagement to form the tubular multilaminate film.

Other features, advantages, and objects of the present invention will become apparent with reference to the following description and accompanying drawings.

BRIEF DESCRIPTION OF DRAWINGS

FIG. 1 is a sectional side view of a preferred form of apparatus constructed in accordance with the teachings of the present invention;

FIG. 2 is a sectional side view of an alternative form of the apparatus; and

FIG. 3 is a cross-sectional view taken along the line 3—3 of FIG. 1.

MODES FOR CARRYING OUT THE INVENTION

Referring now to FIGS. 1 and 3, a preferred form of apparatus constructed in accordance with the teachings of the present invention is illustrated. The apparatus includes a die body 10 having an inner surface 12 defining an interior within which is disposed a die member 14.

Die member 14 has an outer surface 16 positioned adjacent to the die body inner surface and defining helical channels or grooves 18 of the type commonly employed on extrusion dies of the spiral mandrel type. As is conventional, the channels are in communication with a passageway 20 through which molten plastic resin (melt) is fed to the channels in a conventional manner. The die body inner surface 12, the die member outer surface 16, and the helical channels 18 define a first flow path 19 for an annular resin stream of spirally extruded resin initially delivered through passageway 20. The flow path has an entry end at the lower end of the die member 14 and an exit end 22 at the upper extent thereof.

Spirally extruded resin passing out of exit end 22 enters an annular cavity 24 defined by a die head 26 secured to die body 10.

A combining adapter 30, for example of the type shown in U.S. Pat. No. 4,042,661, is secured to the bottom of die body 10. Adapter 30 receives streams of resin from extruders (not shown) and combines them into a composite stream of resin layers which flows into a flow path 32 defined by the die body. Flow path 32 includes an annular chamber 34 or manifold indicated by dash lines. Similar to the arrangement of U.S. Pat. No. 4,042,661, the resin stream divides into two substreams which flow laterally in opposite directions in the outer annular chamber 34 whereby the cross section of the stream changes to annular when the laterally flowing substreams meet.

The annular resin stream formed by the resin supplied by combining adapter 30, after passing through the annular chamber or manifold, passes through an annular slit 36 which comprises a segment of the flow path 32. Slit 36 communicates with annular cavity 24 in the die head, and the multi-layered annular resin stream of non-spirally extruded resin exiting annular slit 36 comes into contact with the annular resin stream of spirally extruded resin passing from exit end 22 of flow path 19.

A combining adaptor 40, which may be similar in construction to combining adapter 30, is connected to the die member 14, and a multi-layer stream of resin exits from combining adapter 40 into a flow path 42 defined by the die member 14. The lower portion of the flow path 42 comprises a manifold or inner annular chamber 44 which breaks the resin into two substreams which flow in the inner annular chamber. The substreams meet at the side of the die member opposed to combining adapter 40 and form another annular resin stream of non-spirally extruded resin which passes through and exits an annular slit 46 also comprising part of the flow path 42. The multi-layered resin stream in flow path 42 exits annular slit 46 within annular cavity 24 defined by the die head and comes into engagement with the annular resin stream of spirally extruded resin exiting exit end 22.

The combined streams of spirally extruded resin and non-spirally extruded resin are expressed through the annular discharge orifice 50 of die head 26. Thus, a tubular multi-laminar film having a plurality of bonded resin sheets is formed. In the arrangement illustrated, the annular resin stream of spirally extruded resin comprises an inner base sheet while the two annular resin streams of non-spirally extruded resin comprise two spaced outer sheets of multi-layer construction. The resin layers of the outer sheets sandwiching the inner spirally extruded sheet are substantially parallel. Both layer uniformity and thickness uniformity result when the manifold and slit shear rates are equal and constant. In some cases this can totally eliminate the need for choker rings or other means to control these characteristics.

In simplified form, the equation for shear rate is $6Q/W \times H^2$. As manifold flow, Q, decreases going towards the ends the object is to decrease the cross-section, defined by width, W, and height, H, so as to maintain a constant value. With respect to coextrusion, it has been found to be important that a constant aspect ratio be maintained while the cross-section is reduced. This approach maintains the established velocity field in the manifold so that the layer thickness ratios are less likely to be distorted.

It may be seen with reference to the foregoing that the invention encompasses not only an apparatus but a method of producing a tubular multilaminate film having a plurality of bonded resin sheets. The method includes the step of forming an annular stream of spirally extruded resin. The annular stream of spirally extruded resin is directed toward an annular discharge orifice.

Simultaneously with the step of forming the annular stream of spirally extruded resin, a first annular stream of non-spirally extruded resin is formed. The first annular stream of non-spirally extruded resin is then directed toward the annular discharge orifice.

The annular streams are spaced and separated while the annular streams are directed toward the annular discharge orifice. The annular streams are combined at the annular discharge orifice, and expressed through the annular discharge orifice while maintaining the combined annular streams in engagement to form the tubular multilaminate film.

According to the arrangement just disclosed, the method also includes the steps of forming a second annular stream of non-spirally extruded resin simultaneously with the step of forming the annular stream of spirally extruded resin. The second annular stream of non-spirally extruded resin is directed toward the discharge orifice while maintaining the second annular stream of non-spirally extruded resin spaced from the other annular streams.

The second annular stream of non-spirally extruded resin is combined with the annular stream of spirally extruded resin and the first annular stream of non-spirally extruded resin at the discharge orifice and all of the combined streams are expressed through the annular discharge orifice.

The first and second annular streams of non-spirally extruded resin are disposed on opposed sides of the stream of spirally extruded resin. The first annular stream of non-spirally extruded resin and the annular stream of spirally extruded resin are substantially concentric.

At least the first annular stream of non-spirally extruded resin passes through a manifold and then through a slit during the step of directing of the first annular stream of non-spirally extruded resin toward the annular discharge orifice, and the method includes the step of maintaining the manifold and slit shear rates substantially constant and equal.

FIG. 2 shows an alternative embodiment of the invention wherein a die body 60 defines an interior accommodating two die members 62, 64, each of which defines outer channels or grooves 66. The die members 62, 64 and die body define annular flow paths 68, 70 which converge at the upper end of the apparatus.

The arrangement of FIG. 2 incorporates a single combining adapter 70 which communicates with a manifold 72 which distributes the resin stream and forms an annular resin stream which exits through a slit 74 before converging with the two spirally extruded annular streams of resin. This embodiment of the invention also discloses an adjustable choke ring 80 to modify the dimensions of the slit as desired.

It is readily apparent that the tubular multilaminate film produced by the embodiment of FIG. 2 will have two resin sheets formed from spirally extruded resin and one multi-layer sheet formed from non-spirally extruded resin.

I claim:

1. Apparatus for producing a tubular multilaminate film, said multilaminate film having a plurality of bonded resin laminae with at least one of said laminae comprising a monolayer lamina and at least one of said laminae being of multi-layer construction, said apparatus comprising, in combination:

a die body having an inner surface defining an interior;

a die member disposed within said interior, said die member having an outer surface positioned adjacent to said die body inner surface and defining helical channels in communication with said outer surface, said die body inner surface, said die member outer surface and said helical channels defining a first flow path for a first annular resin stream of spirally extruded resin for forming a monolayer lamina, said first flow path having an entry end and an exit end;

means defining a second flow path spaced from said first flow path for a second annular resin stream of non-spirally extruded resin for forming a lamina of multi-layer construction, said second flow path having an entry end and an exit end and including a manifold and an adjoining annular slit substantially concentric with said first flow path, said second flow path being substantially unobstructed between the entry and exit ends thereof and said manifold and slit shear rates being substantially equal and constant for promoting layer and thickness uniformity of said lamina of multi-layer construction;

means for combining and substantially simultaneously introducing a plurality of resin streams for forming said lamina of multi-layer construction into said second flow path entry end whereby said combined plurality of resin streams enter said manifold; and means combining the annular streams of spirally extruded resin and non-spirally extruded resin, said combining means defining an annular discharge orifice in communication with said first and second flow paths through which the combined streams of spirally extruded resin and non-spirally extruded resin are expressed while in engagement to form said tubular multilaminate film.

2. The apparatus according to claim 1 wherein said means defining a second flow path at least partially comprises said die body and wherein said manifold and annular slit are defined by said die body.

3. The apparatus according to claim 1 wherein said means defining a second flow path at least partially comprises said die member and wherein said manifold and annular slit are defined by said die member.

4. The apparatus according to claim 1 additionally comprising means defining a third flow path spaced from said first and second flow paths and substantially concentric therewith for a third annular resin stream of non-spirally extruded resin, said third flow path having an entry end and an exit end, said third flow path being in communication with said combining means annular discharge orifice whereby said third annular resin stream is expressed through said annular discharge orifice along with said first and second annular resin streams.

5. The apparatus according to claim 4 wherein said second and third flow paths are disposed on opposite sides of said first flow path and spaced therefrom whereby said tubular multilaminate film comprises an inner monolayer base lamina formed from spirally extruded resin and two spaced outer laminae formed from non-spirally extruded resin, at least one of said outer laminae being of multi-layer construction.

6. A method of producing a tubular multilaminate film having a plurality of bonded resin laminae with at least one of said laminae comprising a monolayer lamina and at least one of said laminae being of multi-layer construction, said method comprising the steps of:

forming an annular monolayer stream of spirally extruded resin;

directing said annular monolayer stream of spirally extruded resin toward an annular discharge orifice along a first flow path;

simultaneously with the step of forming said annular monolayer stream of spirally extruded resin, forming a first multi-layer, annular stream of non-spirally extruded resin comprising a plurality of resin layers;

directing said first multi-layer annular stream of non-spirally extruded resin toward said annular discharge orifice along a flow path having an entry end and an exit end and including a manifold and an annular slit while subjecting the directed first multi-layer annular stream of non-spirally extruded resins to substantially equal and constant shear forces during flow thereof in both said manifold and in said slit to promote layer and thickness uniformity of said lamina of multi-layer construction;

maintaining said annular streams spaced and separated while said annular streams are directed toward said annular discharge orifice;

combining said annular streams at said annular discharge orifice; and expressing said combined annular streams through said annular discharge orifice while maintaining said combined annular streams in engagement to form said tubular multilaminate film.

7. The method according to claim 6 including the steps of forming a second annular stream of non-spirally extruded resin simultaneously with the step of forming said annular stream of spirally extruded resin, directing said second annular stream of non-spirally extruded resin toward said discharge orifice while maintaining said second annular stream of non-spirally extruded resin spaced from the other annular streams, combining said second annular stream of non-spirally extruded resin with said annular stream of spirally extruded resin and said first annular stream of non-spirally extruded resin at said discharge orifice and expressing all of said combined annular streams through said annular discharge orifice.

8. The method according to claim 7 wherein said first and second annular streams of non-spirally extruded resin are disposed on opposed sides of said stream of spirally extruded resin.

* * * * *